(12) United States Patent
Barrau

(10) Patent No.: US 6,968,007 B2
(45) Date of Patent: Nov. 22, 2005

(54) METHOD AND DEVICE FOR SCALABLE VIDEO TRANSCODING

(75) Inventor: Eric Barrau, Puteaux (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 373 days.

(21) Appl. No.: 10/221,069

(22) PCT Filed: Jan. 10, 2002

(86) PCT No.: PCT/IB02/00055

§ 371 (c)(1),
(2), (4) Date: Sep. 6, 2002

(87) PCT Pub. No.: WO02/056598

PCT Pub. Date: Jul. 18, 2002

(65) Prior Publication Data

US 2003/0035488 A1 Feb. 20, 2003

(30) Foreign Application Priority Data

Jan. 12, 2001 (EP) .......................... 01400087

(51) Int. Cl.$^7$ .............................. H04N 7/18
(52) U.S. Cl. .................... 375/240.14; 375/240.12; 375/240.13
(58) Field of Search .................. 375/240.02–240.26

(56) References Cited

U.S. PATENT DOCUMENTS

| | | | |
|---|---|---|---|
| 6,259,741 B1 * | 7/2001 | Chen et al. ............. | 375/240.26 |
| 6,532,593 B1 * | 3/2003 | Moroney ................... | 725/142 |
| 6,625,211 B1 * | 9/2003 | Etoh et al. ............. | 375/240.03 |
| 6,647,061 B1 * | 11/2003 | Panusopone et al. .. | 375/240.12 |
| 2002/0136311 A1 * | 9/2002 | Bourge et al. ......... | 375/240.26 |
| 2002/0168011 A1 * | 11/2002 | Bourge ................... | 375/240.27 |

FOREIGN PATENT DOCUMENTS

EP     1032217 A2    8/2000     H04N/7/26

* cited by examiner

*Primary Examiner*—Andy Rao

(57) ABSTRACT

The invention relates to a scalable video transcoding method for transcoding an input video signal (103) coded according to MPEG-2 video standard, resulting in four transcoding architectures. Scalability is obtained by means of to switches (120) and (130) determining whether or not reconstruction (118) and motion compensation (128) of the coding error (119) are performed. Each architecture thus defined having a different processing complexity, the overall processing resources available can be optimally used and minimized along a group of frames in the transcoding of parts of said frames in accordance with one of these four architectures, while ensuring a good video quality of tanscoded signal (109). A cost-effective control strategy of said switches based on an energy prediction of said coding error is also proposed.

12 Claims, 7 Drawing Sheets

METHOD AND DEVICE FOR SCALABLE VIDEO TRANSCODING

Figure 1:
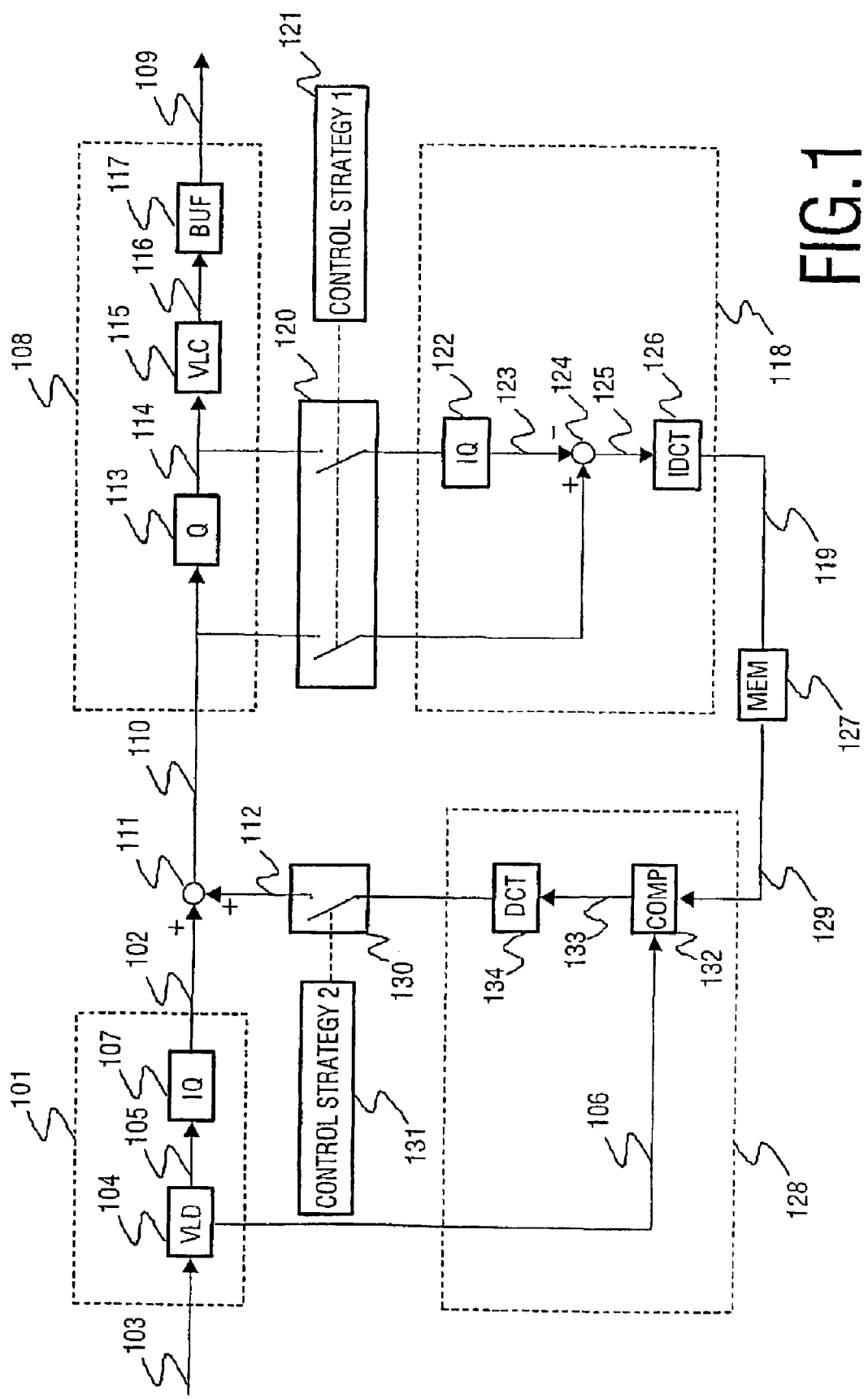

The present invention relates to a method of modifying data in an input coded video signal for generating an output video signal, each video signal corresponding to a sequence of coded video frames, said method comprising at least:

an error decoding step for delivering a decoded data signal from a current input coded video frame, a re-encoding step for delivering an output video frame carried by said output video signal from a modified signal, said modified signal resulting from an adding sub-step between a motion-compensated signal and said decoded data signal, a reconstruction step for delivering a coding error of said output video frame, a motion-compensation step for delivering said motion-compensated signal from a stored coding error of a previous output video frame.

The invention also relates to a transcoding device for carrying out said method. This invention may be used, for instance, in the field of video broadcasting.

Transcoding a coded data signal has become a vital function in the field of video broadcasting. For instance, when an input video signal coded according to the MPEG-2 standard has to be broadcast on a transmission channel of limited bandwidth, a transcoding method can be applied to said input video signal so that the resulting output video signal has a reduced bitrate that fits within said limited bandwidth.

A transcoding method is proposed in the European patent application EP 0 690 392 A1. This patent application describes a method and its corresponding device for modifying a coded data signal. In particular, this method is used for reducing the bitrate of an input video signal coded according to the MPEG-2 standard.

It is an object of the invention to provide a method of modifying data in a coded data signal which renders it possible to generate a modified video signal with a better rendering quality when a maximum amount of processing resources.

The prior art method is based on a transcoding architecture including a motion compensation branch avoiding a quality drift on transcoded video frames. This motion compensation branch encompasses said reconstruction and motion compensation steps. Although leading to a high-quality transcoding, this architecture remains complex because the motion compensation branch requires discrete cosine transform (DCT), inverse discrete cosine transform (IDCT), inverse quantization (IQ) and motion compensation (COMP) steps. Such an architecture is thus dedicated to video devices having a large amount of processing resources.

With video devices of limited processing resources, such as consumer products, therefore, the prior art method cannot be implemented.

The motion compensation branch may be suppressed in order to decrease the computational load, leading to the so-called requantization architecture, but this will be to the detriment of the transcoded video signal quality. In this case, moreover, since the requantization architecture is cost-effective, the processing resources are not optimally used, i.e. they are not all used.

To solve the limitations of the prior art method, the method of modifying data according to the invention is characterized in that said method comprises:

a first switching step inserted between said re-encoding step and said reconstruction step for activating said reconstruction step, a second switching step inserted between said motion-compensation step and said adding sub-step for activating said motion-compensation step, said switching steps being controlled independently by a control strategy for defining a scalable method defining four architectures for modifying said input coded video signal.

This method renders it possible to define the following four transcoding architectures, which are alternatively activated during the transcoding of an input video signal:

requantization architecture: the motion compensation branch is suppressed in the prior art transcoding architecture, reconstruction architecture: the motion compensation step is suppressed in the prior art transcoding architecture, motion-compensation architecture: the reconstruction step is suppressed in the prior art transcoding architecture, high quality architecture: corresponds to the prior art transcoding architecture.

In this way the transcoding method becomes scalable because four architectures can be defined. Each architecture thus defined having a different processing complexity, the overall processing resources available can be optimally used in transcoding parts of said input video signal according to one of this four architectures, without having unused processing resources as in the prior art method.

This optimized use of processing resources is based on a cost-effective control process which activates said switching steps and allows the system to apply a different transcoding architecture from one macroblock to another. To this end, the method is characterized in that the control strategy of said first switching step, performed at the macroblock level, comprises:

a first prediction sub-step of the energy of said coding error, said coding error energy being predicted for all re-encoded macroblocks of an output video frame, a first selection sub-step for identifying, among macroblocks defining said coding error, a first set of macroblocks having a predicted coding error energy below a given threshold, the coding error of said first set of macroblocks being set to a zero value so as to result in a modified stored coding error, a second selection sub-step for identifying, among macroblocks defining said coding error, a second set of macroblocks having a predicted coding error energy above said given threshold, said first switching step activating the reconstruction step for said second set of macroblocks.

The method is also characterized in that the control strategy of said second switching step, performed at the macroblock level, comprises:

a second prediction sub-step of the energy of said motion-compensated signal, said energy being predicted at the macroblock level, a third selection sub-step for identifying, within said motion-compensated signal, a third set of macroblocks having a predicted energy above said given threshold, said second switching step activating the motion-compensation step for each macroblock defining said decoded data signal, which motion-compensated macroblock belongs to said third set of macroblocks.

This control process can perform motion compensation and/or reconstruction steps only for these macroblocks in the input video signal which may introduce quality drift in the resulting transcoded output video signal.

This transcoding method and its corresponding transcoding device implementing said method render it possible to obtain a good video quality of the transcoded signal for a given amount of processing resources.

Detailed explanations and other aspects of the invention will be given below.

Figure 2:
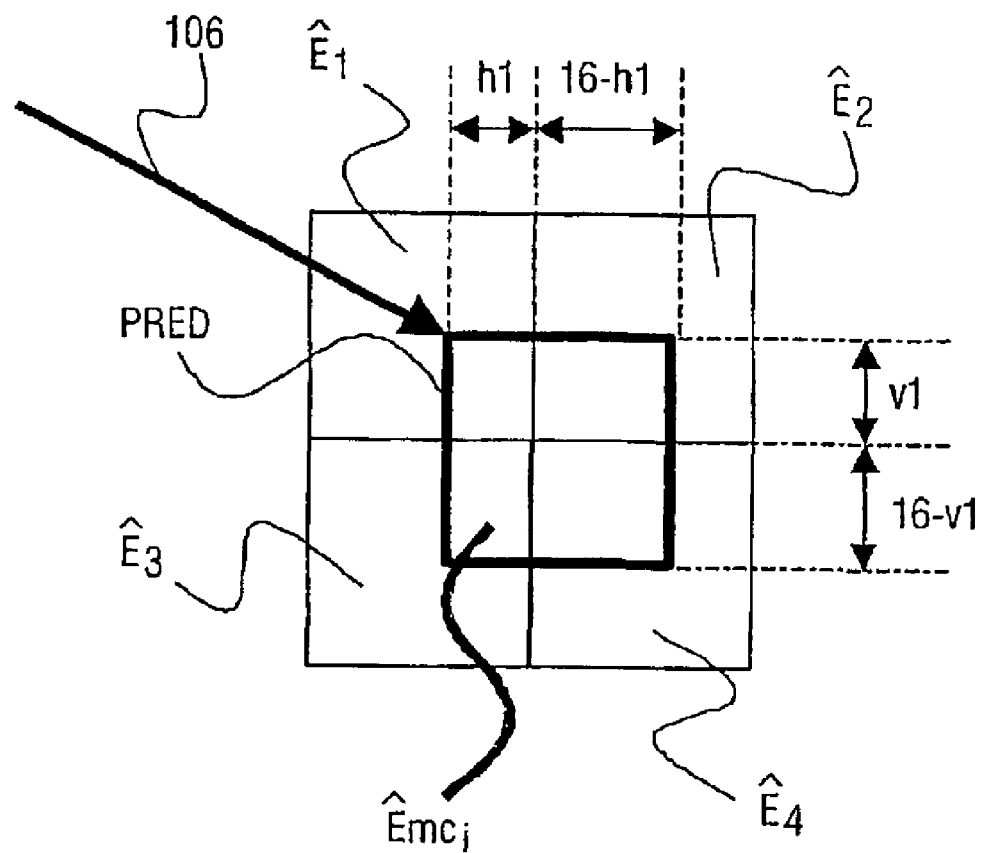
Figure 3:
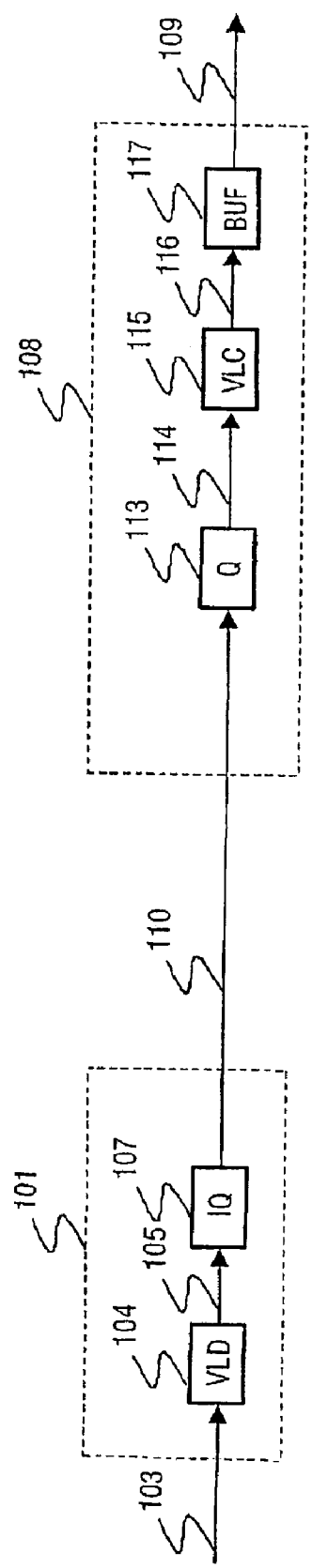
Figure 4:
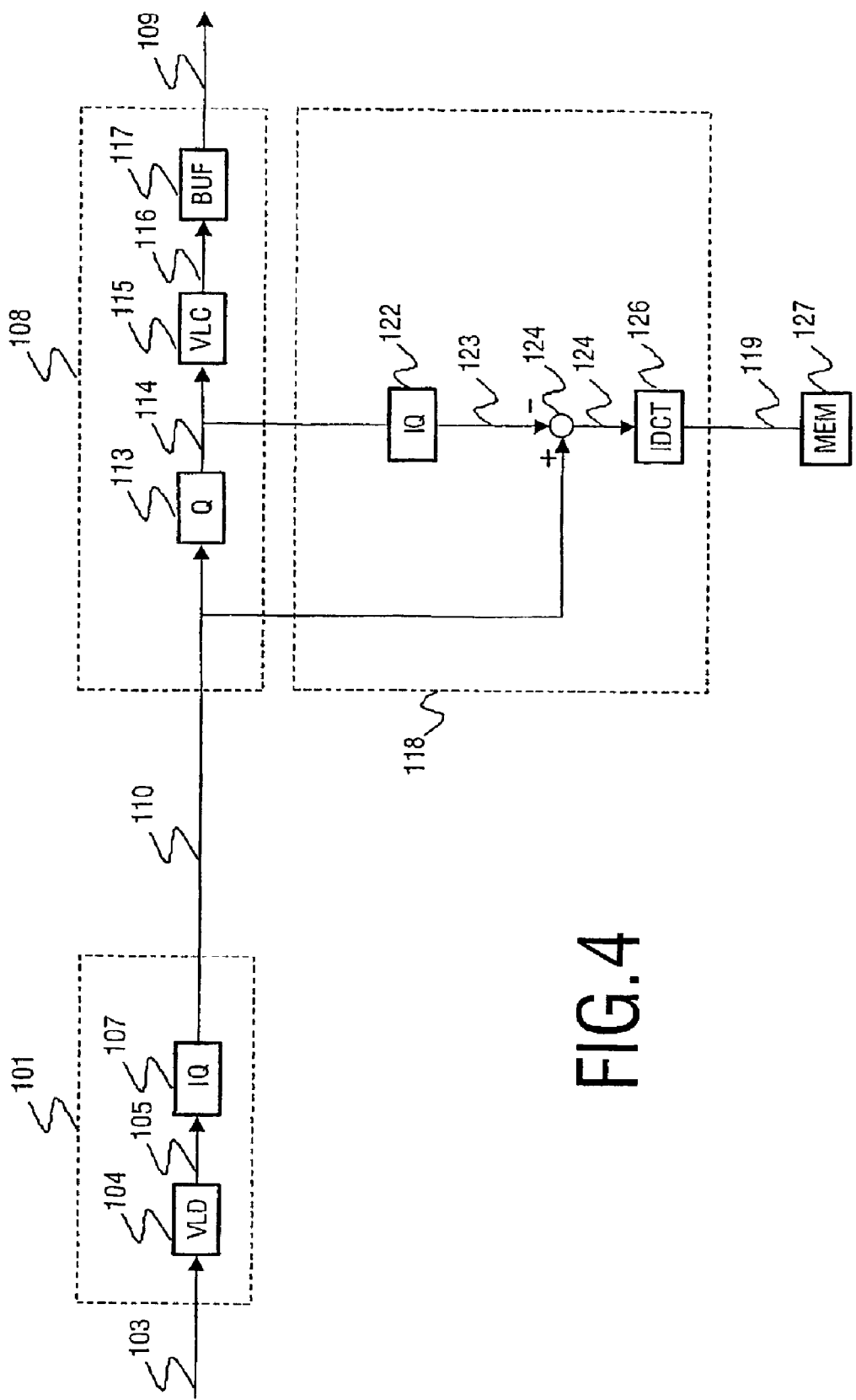
Figure 5:
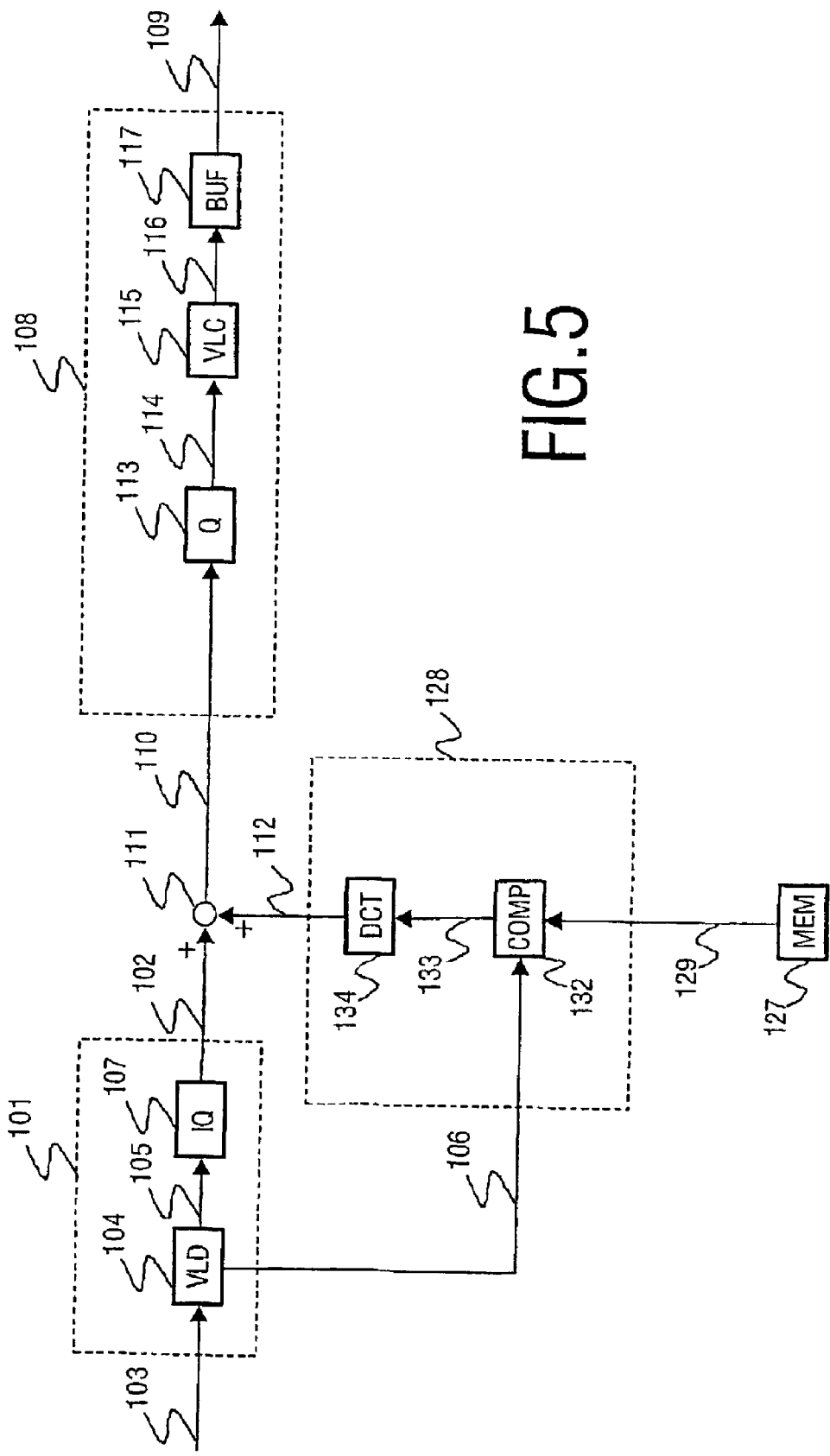
Figure 6:
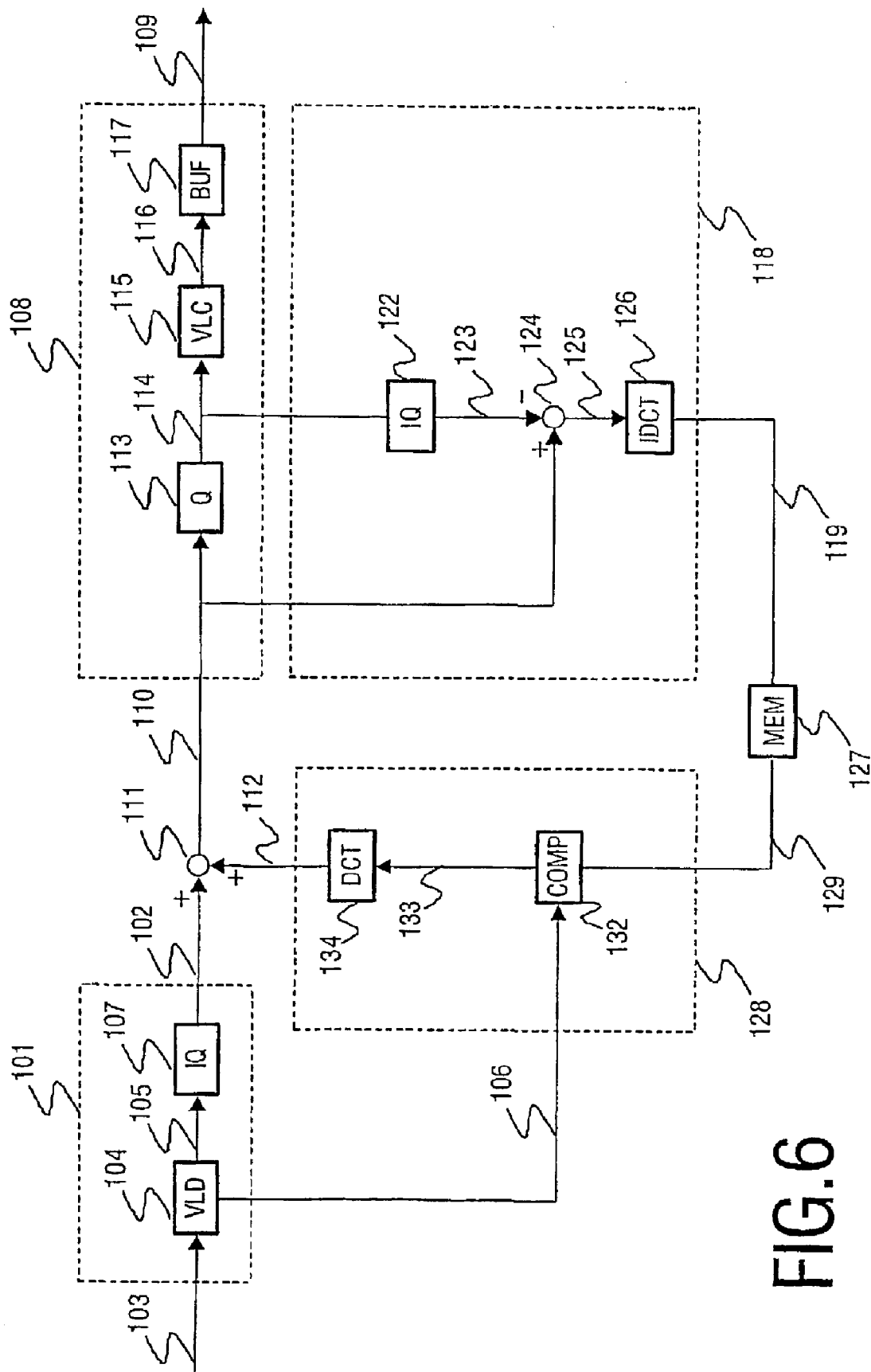
Figure 7:
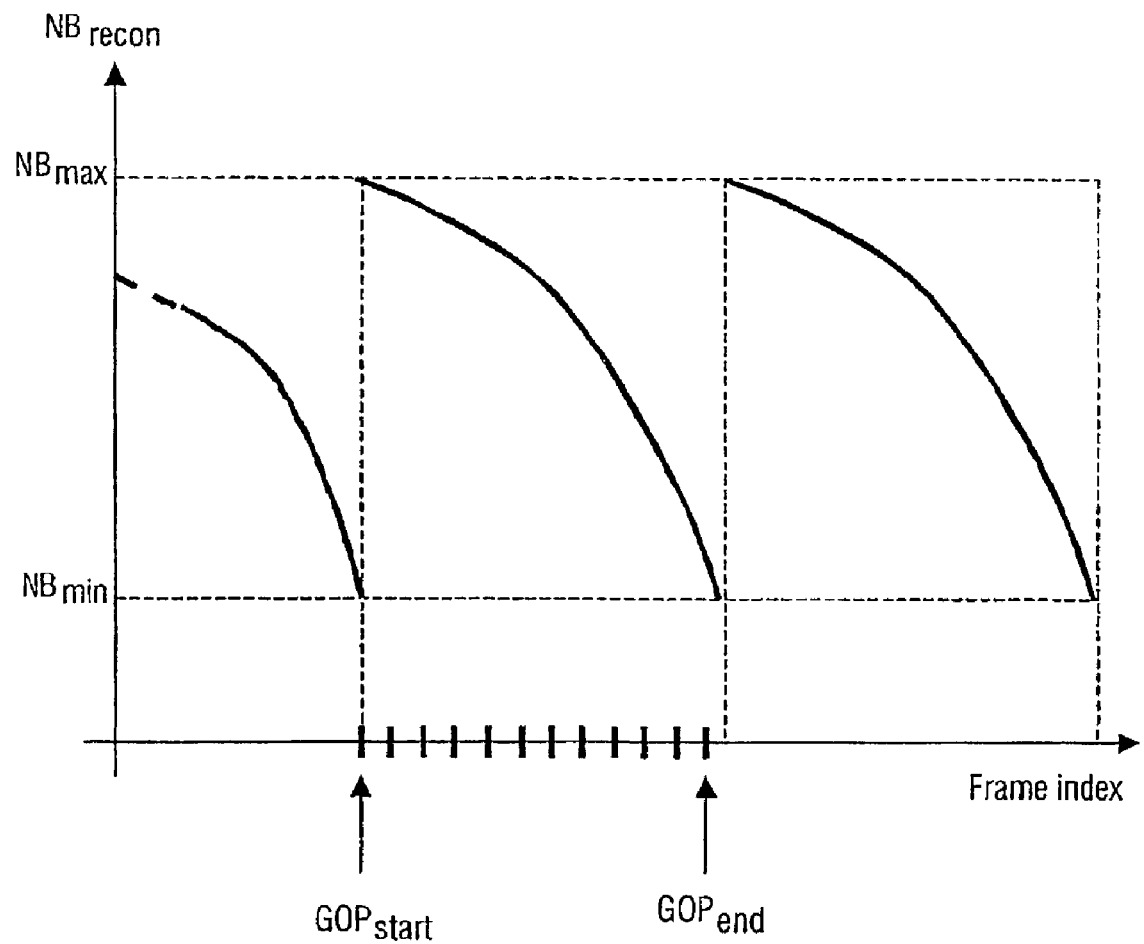

The particular aspects of the invention will now be explained with reference to the embodiments described hereinafter and considered in connection with the accompanying drawings, in which identical parts or sub-steps are designated in the same manner:

FIG. 1 depicts the general embodiment of a transcoding architecture according to the invention, FIG. 2 depicts the energy prediction of a temporal predictor according to the invention, FIG. 3 depicts a first transcoding architecture according to the invention, FIG. 4 depicts a second transcoding architecture according to the invention, FIG. 5 depicts a third transcoding architecture according to the invention, FIG. 6 depicts a fourth transcoding architecture according to the invention, FIG. 7 depicts the variation of the number of reconstructed macroblocks along a GOP.

The present invention is well adapted to the transcoding of MPEG-2 input coded video signals, but it will be apparent to those skilled in the art that it is applicable to any coded signal encoded by a block-based compression method such as, for example, the one described in MPEG-4, H.261 or H.263 standards.

The invention will be described in detail below assuming that input and output coded video signals comply with the MPEG-2 international video standard (Moving Pictures Experts Group, ISO/IEC 13818-2). It is assumed that a video frame is divided into adjacent squared areas of 16*16 pixels called macroblocks.

FIG. 1 depicts the general embodiment of a transcoding device according to the invention. This transcoding device is based on a transcoder arrangement comprising the following functional steps:

an error decoding step 101 for delivering a decoded data signal 102 from a current input coded video signal 103. This step comprises a variable length decoding (VLD) 104 of at least DCT coefficients and motion vectors contained in signal 103. This step consists in an entropy decoding, e.g. by means of an inverse look-up table of Huffman codes, allowing to obtain decoded DCT coefficients 105 and motion vectors 106. In series with said step 104, an inverse quantization (IQ) 107 is performed on said decoded coefficients 105 for delivering said decoded data signal 102. This inverse quantization 107 consists in multiplying said DCT decoded coefficients 105 by a quantization factor contained in said input signal 103. In most cases this inverse quantization is performed at the macroblock level because said quantization factor may change from one macroblock to another. The decoded signal 102 is in the frequential domain.

a re-encoding step 108 for delivering an output video signal 109 corresponding to the signal resulting from the transcoding of said input video signal 103. Said re-encoding 108 acts on a modified signal 110 which results from the addition, by means of the adding sub-step 111, of said decoded data signal 102 to a motion compensated signal 112. Said re-encoding step 108 comprises in series a quantization (Q) 113. This quantization 113 consists in dividing DCT coefficients contained in signal 110 by a new quantization factor for delivering quantized DCT coefficients 114. This new quantization factor characterizes the modification performed by the transcoding of said input coded video signal 103, because, for example, a large quantization factor may result in a bitrate reduction of said input coded video signal 103. In series with said quantization 113, a variable length coding (VLC) 115 is applied to said coefficients 114 for obtaining entropy coded DCT coefficients 116. Similar to VLD processing, VLC processing consists in a look-up table for associating a Huffman code with each coefficient 114. Then coefficients 116 are accumulated in a buffer 117 for constituting transcoded frames carried by said output video signal 109.

a reconstruction step 118 for delivering a coding error 119 of said output video signal 109. This reconstruction step renders it possible to quantify the coding error introduced by the quantization 113. As will be explained in a following paragraph, such a coding error of a current transcoded video frame can be taken into account for the transcoding of the next video frame for avoiding a quality drift in the output video signal 109. This reconstruction step is connected to said re-encoding step 108 by a first switching step 120. Said first switching step 120 isolates said reconstruction step 118 from said re-encoding step 108 if the switch is open, or enables the reconstruction of a coding error if the switch is closed. This first switching step is controlled by a control process 121, for selecting the open or close mode, as will be explained in a following paragraph. If said first switching step is closed, signals 110 and 114 are simultaneously sent to said reconstruction step 118. In that case an inverse quantization (IQ) 122 is performed on said signal 114, resulting in signal 123. A subtraction sub-step 124 is then performed between signal 110 and signal 123. The resulting signal 125 corresponds to said coding error, in the frequency domain, caused by the quantization 113. An IDCT step 126 is then performed on said signal 125 for obtaining said coding error 119 in the pixel domain. To illustrate said reconstruction step 118 performed at the macroblock level, a current macroblock carried by signal 110 results after transcoding in a modified macroblock carried by signal 114, the loss of quality of said modified macroblock being quantified by a coding error macroblock carried by signal 119. During the transcoding of an input current video frame, if the reconstruction of a macroblock is activated, the resulting coding error 119 is stored in memory 127 in order to be used during the transcoding of the next input video frame. Otherwise, the coding error of macroblocks for which no reconstruction is performed is set to a zero value and stored in said memory 127.

a motion-compensation step 128 for delivering said motion-compensated signal 112 from a stored coding error 129 relative to the previous transcoded video frame. This motion-compensation step 128 is connected to said adding sub-step 111 by a second switching step 130. Said second switching step 130 isolates said motion compensation step 128 from said adding sub-step 111 if the switch is open, or releases the motion-compensation of a coding error if the switch is closed. This second switching step is controlled by a control process 131, allowing, as explained in a following paragraph, the system to select the open or close mode. If said second switching step is closed, signal 112 is sent to said adding sub-step 111. In that case a motion-compensation 132 is performed on the basis of said stored coding error 129, using motion vectors 106.

Such a motion compensation 132 being performed in the pixel domain, the resulting pixel-based motion-compensated signal 133 is passed through a DCT step 134 so that the resulting frequential motion-compensated signal 112 can be added to said decoded data signal 102.

Four transcoding architectures can thus be derived from this general architecture described above by means of the two switching steps 120 and 130:

requantization architecture, reconstruction architecture, motion-compensation architecture, high-quality architecture.

A scalable transcoding method is thus obtained which renders it possible to apply one of these four architectures to a given macroblock to be transcoded, in taking into account not only criteria for obtaining the best video quality of the transcoded macroblocks, but also criteria for minimizing the computational load.

The reconstruction switch strategy 121 is based on a cost-effective prediction, without reconstruction, of the coding error energy of each transcoded macroblock. Indeed, since the energy of said coding error represents the amount of degradation imposed on the input video signal by the transcoding, it is a relevant criterion for detecting macroblocks which will require reconstruction, so that this coding error will not propagate over macroblocks in the subsequent transcoded frames, whereby a quality drift is avoided.

The principle of said reconstruction switch strategy 121, accordingly, is to reconstruct only coding error macroblocks having a high energy.

Let us adopt the following notations:

$M_{max}$ is the number of macroblocks in a video frame, $NB_{recon}$ is the number of reconstructed macroblocks in a transcoded video frame, i is the rank of a macroblock in a video frame verifying $1<I<M_{max}$, (i implicitly refers to a couple of horizontal and vertical indices in said video frame), $X_i$ refers to coefficients defining a macroblock having rank i carried by signal 110, $Y_i$ refers to coefficients defining a macroblock having rank i carried by signal 114, $YDQ_i$ refers to coefficients defining a macroblock having rank i carried by signal 123, $z_i$ refers to coefficients defining a macroblock having rank i carried by signal 119, $Z_i$ refers to coefficients defining a macroblock having rank i carried by signal 125, IQ(s) is the inverse quantized signal of signal s, Ê(s) is the predicted energy of signal s, E(s) is the energy of signal s, $Q_{out}$ is the quantization factor used in step 113.

The coding error energy of a given macroblock $z_i$ is predicted as follows. The Parseval theorem, indicating that the energy of a signal is the same in the frequential domain as in the pixel domain, implies that it can be written:

$$E(z_i)=E(Z_i)$$

$$E(z_i)=E(X_i-YDQ_i)$$

$$E(z_i)=E(X_i-IQ(Y_i)) \quad \text{Eq.1}$$

According to the MPEG-2 video standard, it can be written:

$$IQ(Y_i)=(2*Y_i+k)*W_i*Q_{out}/32 \quad \text{Eq.2}$$

where $W_i$ is a weighted matrix and $$k = \begin{cases} 0 & \text{for INTRA macroblocks} \\ \text{sign}(Y_i) & \text{for non-INTRA macroblocks} \end{cases}$$

If k is set to 0, and $W_i$ is set to 16 (i.e. a flat matrix), said coding error prediction $\hat{E}(z_i)$ can be evaluated according to the following equation:

$$\hat{E}(z_i)=E(X_i-Y_i\times Q_{out}) \quad \text{Eq.3}$$

This energy prediction is cost-effective because the IDCT step 126 and the IQ step 122 are not performed.

Considering a current transcoded video frame, an energy prediction according to Eq. 3 is first performed on all transcoded macroblocks in said current video frame. In this way a set of $M_{max}$ predicted coding error energy values is obtained. This set of predicted coding error energies are sorted in an increasing order for determining a first set of macroblocks having a predicted coding error energy below a given threshold Ec and a second set of macroblocks having a predicted coding error energy above said given threshold Ec. The reconstruction step is then performed, by closing said switch 120, only on said second set of macroblocks comprising $NB_{recon}$ macroblocks. The resulting reconstructed macroblocks, carried by signal 119, are then stored in memory 127. In parallel, the ranks and predicted coding energies of reconstructed macroblocks are stored in an auxiliary memory.

Said energy threshold Ee may be set to a fixed value, leading to a varying number of reconstructed macroblocks $NB_{recon}$ from frame to frame. Said threshold may also be determined so as to take into account the processing resources available on the transcoding platform. Thus, it can be decided not to reconstruct more than a given percentage P of macroblocks in any frame, with $P=100*NB_{recon}/M_{max1}$. In this last case, the energy threshold Ec corresponds to the energy of the macroblock in said second set having the lowest energy.

Since macroblocks of said first set are supposed to have a small coding error, the reconstruction is not performed for these macroblocks (switch 121 open) in a next step, and their coding error is set to a zero value. Ranks of non-reconstructed macroblocks are stored in said auxiliary memory, as were reconstructed macroblocks In contrast to a coding error obtained after a reconstruction performed on all macroblocks of a current frame, a modified coding error stored in memory 127 is obtained in that only a reconstruction is performed for said second set of macroblocks and said first set of macroblocks is set to a zero value. Note that this stored modified coding error is used for a quality drift correction not during the transcoding of said current frame, but during the transcoding of the next frame.

The motion-compensation switching strategy 131 is based on a cost-effective energy prediction of the temporal predictor macroblock carried by signal 112 of each macroblock carried by signal 102 for which a motion-compensation can be performed. Of course, this motion-compensation does not relate to video frames coded according to an INTRA mode, but only to video frames coded according to a previous frame, e.g. P and B modes. The energy of said temporal predictor, also called motion-compensated macroblock, is a relevant criterion for detecting macroblocks carried by signal 102 that may introduce quality drift if no motion-compensation is performed during their transcoding.

The principle of said motion compensation switching strategy 131 is to perform motion-compensation for input macroblocks carried by signal 102 for which the energy of their temporal predictor is high.

As is depicted in FIG. 2, the temporal predictor is the macroblock PRED pointed by motion vector 106 representing said modified stored coding error, said macroblock PRED overlapping four adjacent macroblocks in the general case. Such a motion vector, associated with an input macroblock carried by signal 102 for which a transcoding is expected, renders it possible to retrieve indices of macroblocks overlapped by said macroblock PRED, and thus to retrieve their stored predicted coding error energy $\hat{E}_i$. The predicted energy $\hat{E}mc_i$ of said temporal predictor macroblock is determined from a weighted average of the predicted coding error energies $\hat{E}_i$ relative to said four macroblocks stored in said auxiliary memory, according to the equation:

$$\hat{E}mc_i = K * \frac{h1*v1*\hat{E}_1 + (16-h1)*v1*\hat{E}_2 + h1*(16-v1)*\hat{E}_3 + (16-v1)*(16-v1)*\hat{E}_4}{16*16} \quad \text{Eq. 4}$$

with K a correcting factor talking into account the pixel interpolation performed on said four adjacent macroblocks, for motion vectors 106 having ½ pixel coordinates, with v1 and h1 the number of pixels of macroblock having rank 1 overlapped by macroblock PRED.

A calculation of $\hat{E}mc_i$ is thus performed for each non-INTRA input macroblock i carried by signal 102. This predicted value is then compared with said energy threshold Ec. If $\hat{E}mc_i<Ec$, the switch 130 remains open during the transcoding of said input macroblock, so that the motion compensation is not performed. If $\hat{E}mc_i>Ec$, however, the switch 130 remains closed during the transcoding of said input macroblock, so that the motion-compensation is performed, avoiding the quality drift so as to ensure a good quality of the resulting transcoded macroblocks carried by signal 114 (and 109).

According to the invention, many energy calculations can be performed. For example, energy calculation may be based on the standard L2, also known as quadratic energy, applied to the set of values defining the macroblock for which an energy prediction is expected (frequency-or pixel-based values). Similarly, such a calculation may also be performed in using standard L1, which requires less processing means. FIG. 3 corresponds to the requantization architecture derived from the general transcoding architecture depicted in FIG. 1 according to the invention.

This is the less expensive architecture because an input current macroblock carried by signal 102 is neither reconstructed nor motion-compensated. As a consequence, the transcoding consists in a decoding 101 followed by a re-encoding 108. Such an architecture is defined through opening of switches 120 and 130, said switches being controlled in accordance with the strategy described above. Although this architecture will generally introduce major loss of quality in transcoded macroblocks, no loss of quality is expected in its use in the context of the invention because it is only performed on input targeted macroblocks having a low predicted coding error energy and a low temporal predictor energy.

FIG. 4 corresponds to the reconstruction architecture derived from the general transcoding architecture depicted in FIG. 1 according to the invention.

As in the requantization architecture, the transcoding of an input current macroblock consists in a decoding 101 followed by a re-encoding 108. Such an architecture is defined through closing of switch 120 in opening of switch 130, said switches being controlled in accordance with the strategy described above. The same video quality as the one obtained with the requantization architecture is expected for the transcoded macroblocks. Transcoded macroblocks having a high predicted coding error energy are reconstructed and stored in memory 127 so that they may be used as temporal predictors during the transcoding of macroblocks of the next input video frame.

FIG. 5 corresponds to the motion-compensation architecture derived from the general transcoding architecture depicted in FIG. 1 according to the invention.

The transcoding of an input current macroblock consists in a decoding 101, which results in the decoded data signal 102, which is added to the motion compensated signal 112 resulting from the motion compensation 128. Such an architecture is defined through opening of switch 120 and closing of switch 130, said switches being controlled in accordance with the strategy described above. The motion compensation 128, performed on stored coding error macroblocks of the previous transcoded video frame, avoids quality drift so that a constant video quality of transcoded frames is obtained from one frame to the next in the output video signal 109.

FIG. 6 corresponds to the high-quality architecture derived from the general transcoding architecture depicted in FIG. 1 according to the invention.

As in the motion-compensation architecture, the transcoding of an input current macroblock consists in a decoding 101 which results in the decoded data signal 102 which is added to the motion-compensated signal 112 resulting from the motion compensation 128. Such an architecture is defined through closing of the switches 120 and 130, said switches being controlled in accordance with the strategy described above. The motion compensation 128, performed on stored coding error macroblocks of the previous transcoded video frame, avoids quality drift so that a constant video quality of transcoded frames is obtained from one frame to the next in the output video signal 109. At the same time, any coding error relative to transcoded macroblocks is reconstructed and stored in view of possible future use by the motion compensation during the transcoding of the next input video frame.

As was noted above, setting the number $NB_{recon}$ of reconstructed coding error macroblocks per frame renders it possible to define an energy threshold Ec, the motion compensation being only performed for input macroblocks whose temporal predictors have a predicted energy above said energy threshold.

If Ec has a very low value, most coding error macroblocks will be reconstructed, and most input macroblocks will be motion-compensated, leading to a high quality of transcoded frames but to an expensive solution. By contrast, if Ec has a high value, most coding error macroblocks will not be reconstructed, and most input macroblocks will not be motion-compensated, leading to a poor quality of transcoded frames but to an expensive solution.

A method of obtaining the best compromise between cost and quality is then proposed. It takes into account that the quantization error caused by step 113 propagates from frame to frame inside a GOP (Group Of Pictures) if coding error macroblocks are neither reconstructed nor motion-compensated. This error propagation inside a GOP is exacerbated by P and B frames (i.e. temporally predicted frames), but stops at each beginning of a new GOP (i.e. on an INTRA frame). Moreover, the first temporally predicted frame inside a GOP which serves as a temporal reference for the following temporally predicted frames is more important than the last frames, because here the error propagation will spread over a smaller number of frames. Thus the number $NB_{recon}$ can be correlated to the frame position inside a GOP such that $NB_{recon}$ has a decreasing value along a GOP, while keeping an average number of reconstructed macroblocks with in the range of what is allowed for the processing resources.

The variation of $NB_{recon}$ along a GOP comprising 12 frames (one INTRA frame followed by eleven temporally predicted frames) is depicted in FIG. 7. This number varies from a maximum $NB_{max}$ for the first frame, to a minimum $NB_{min}$ for the last frame. In this way more macroblocks are reconstructed at the beginning of a GOP for the purpose of ensuring a good quality of the next transcoded frames through activation of the motion compensation. Fewer macroblocks are reconstructed, however, at the end of a GOP, for the purpose of reducing the computational load as much as possible, but without significant loss of quality. Thus, a good and constant quality is obtained along a GOP while the processing resources are optimally utilized.

In a particular embodiment of the invention, the switches 120 and 130 are implemented at the frame level instead of at the macroblock level. In this case, the overall macroblocks of a given input frame are transcoded in accordance with one of the four described transcoding architectures. Although this strategy leads to a coarser scalability level, it is a cost-effective solution since control strategies 121 and 131 only have to update the switching steps 120 and 130 at the beginning of each frame.

This scalable method of transcoding an input coded video signal may be implemented in several manners in a transcoding device. The transcoding device may correspond to broadcasting equipment for performing a bitrate change on an MPEG-2 coded video signal, but may alternatively correspond to a consumer product such as a set-top box or a DVD (Digital Video Disc), where a bitrate change is performed for storing or recopying an MPEG-2 coded video signal.

From a material point of view, this scalable method may be implemented by means of wired electronic circuits or, alternatively, by means of a set of instructions stored in a computer-readable medium, said instructions replacing at least a portion of said circuits and being executable under the control of a computer or a digital processor in order to carry out the same functions as fulfilled in said replaced circuits. The invention then also relates to a computer-readable medium comprising a software module which includes computer-executable instructions for performing the steps, or some steps, of the method described above.

According to the invention, an optimization of the memory space 127 is proposed. It consists in storing in said memory only reconstructed coding error macroblocks, and not coding error macroblocks forced to a zero value. Said memory may thus be proportioned for storing only $NB_{max}$ reconstructed macroblocks, which represents a substantial gain compared with a memory space proportioned for receiving $M_{max}$ macroblocks.

What is claimed is:

1. A method of modifying data in an input coded video signal for generating an output video signal, each video signal corresponding to a sequence of coded video frames, said method comprising at least:
    an error decoding step for delivering a decoded data signal from a current input coded video frame,
    a re-encoding step for delivering an output video frame, carried by said output video signal, from a modified signal, said modified signal resulting from an adding sub-step between a motion-compensated signal and said decoded data signal,
    a reconstruction step for delivering a coding error of said output video frame,
    a motion-compensation step for delivering said motion-compensated signal from a stored coding error of a previous output video frame, characterized in that said method comprises:
    a first switching step inserted between said re-encoding step and said reconstruction step for activating said reconstruction step,
    a second switching step inserted between said motion-compensation step and said adding sub-step for activating said motion-compensation step, said switching steps being controlled independently by a control strategy for defining a scalable method defining four architectures for modifying said input coded video signal;
    wherein the control strategy of said first switching step, performed at the macroblock level, comprises:
    a first prediction sub-step of the energy of said coding error, said coding error energy being predicted for all re-encoded macroblocks of an output video frame,
    a first selection sub-step for identifying, among macroblocks defining said coding error, a first set of macroblocks having a predicted coding error energy below a given threshold, the coding error of said first set of macroblocks being set to a zero value so as to result in a modified stored coding error,
    a second selection sub-step for identifying, among macroblocks defining said coding error, a second set of macroblocks having a predicted coding error energy above said given threshold,
    said first switching step activating the reconstruction step for said second set of macroblocks.

2. A method of modifying data as claimed in claim 1, wherein the control strategy of said second switching step, performed at the macroblock level, comprises:
    a second prediction sub-step of the energy of said motion-compensated signal, said energy being predicted at the macroblock level,
    a third selection sub-step for identifying, within said motion-compensated signal, a third set of macroblocks having a predicted energy above said given threshold,
    said second switching step activating the motion-compensation step for each macroblock defining said decoded data signal, which motion-compensated macroblock belongs to said third set of macroblocks.

3. A method of modifying data as claimed in claim 1, wherein the first prediction sub-step of the energy of said coding error consists in an energy calculation of a signal obtained after subtraction of said output video signal multiplied by a quantization factor from said modified signal.

4. A method of modifying data as claimed in claim 2, wherein the second prediction sub-step of the energy of said motion-compensated signal consists in a weighted average of four previously predicted coding error energy values relating to four adjacent macroblocks which define said modified coding error.

5. A method of modifying data as claimed in claim 2, wherein the motion-compensation step, when activated by said second switching step, is performed on the basis of said modified stored coding error.

6. A method of modifying data as claimed in claim 1, wherein the first switching step is activated so as to obtain a decreasing number of reconstructed macroblocks over a GOP.

7. A method of modifying data as claimed in claim 1, wherein the switching steps are controlled at the frame level, a given input coded video frame being modified in accordance with one of said four architectures.

8. A transcoding device for modifying data in an input coded video signal for generating an output video signal, each video signal corresponding to a sequence of coded video frames, said device comprising at least:
    decoding means for delivering a decoded data signal from a current input coded video frame,
    re-encoding means for delivering an output video frame, carried by said output video signal, from a modified signal, said modified signal resulting from addition means adding a motion-compensated signal to said decoded data signal, reconstruction means for delivering a coding error of said output video frame, motion-compensation means for delivering said motion-compensated signal on the basis of a stored coding error of a previous output video frame, characterized in that said transcoding device comprises:

first switching means inserted between said re-encoding means and said reconstruction means for activating said reconstruction means, second switching means inserted between said motion-compensation means arid said addition means for activating said motion-compensation means, said switching means being controlled independently by control means for defining a scalable transcoding device defining four architectures for modifying said input coded video frames, wherein the control means of said first switching means comprise:

first prediction means for predicting the energy of said coding error, said coding error energy being predicted for all re-encoded macroblocks of an output video frame, first selection means for identifying, among macroblocks defining said coding error, a first set of macroblocks having a predicted coding error energy below a given threshold, the coding error of said first set of macroblocks being set to a zero value so as to result in a modified stored coding error, second selection means for identifying, among macroblocks defining said coding error, a second set of macroblocks having a predicted coding error energy above said given threshold, said first switching means activating the reconstruction means for said second set of macroblocks.

9. A transcoding device for modifying data as claimed in claim 8, wherein the control means of said second switching means comprise:

second prediction means for predicting the energy of said motion-compensated signal, said energy being predicted at the macroblock level, third selection means for identifying, within said motion-compensated signal, a third set of macroblocks having a predicted energy above said given threshold, said second switching means activating motion compensation means for each macroblock defining said decoded data signal, which motion-compensated macroblock belongs to said third set of macroblocks.

10. A transcoding device for modifying data as claimed in claim 8, wherein said modified coding error is stored in a memory whose capacity is proportioned for storing only reconstructed macroblocks.

11. A set-top box product for modifying data in an input coded video coded according to the MPEG-2 video standard, said set-top box product implementing steps and sub-steps of the method as claimed in claim 1.

12. A computer program product for a transcoding device for modifying data in a coded video signal, which product comprises a set of instructions which, when loaded into said device, causes said device to carry out any method as claimed in claim 1.

* * * * *